(12) United States Patent
Kim et al.

(10) Patent No.: US 11,384,178 B2
(45) Date of Patent: Jul. 12, 2022

(54) CONJUGATED DIENE-BASED POLYMER AND METHOD FOR PREPARING THE SAME

(71) Applicant: LG Chem, Ltd., Seoul (KR)

(72) Inventors: Su Hwa Kim, Daejeon (KR); Hyo Jin Bae, Daejeon (KR); Sung Ho Park, Daejeon (KR); Soo Young Choi, Daejeon (KR); Jeong Heon Ahn, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/765,028

(22) PCT Filed: Nov. 13, 2018

(86) PCT No.: PCT/KR2018/013790
§ 371 (c)(1),
(2) Date: May 18, 2020

(87) PCT Pub. No.: WO2019/103383
PCT Pub. Date: May 31, 2019

(65) Prior Publication Data
US 2020/0399405 A1  Dec. 24, 2020

(30) Foreign Application Priority Data
Nov. 22, 2017 (KR) .......... 10-2017-0156567

(51) Int. Cl.
*C08F 36/06* (2006.01)
*C08F 8/30* (2006.01)

(52) U.S. Cl.
CPC .......... *C08F 36/06* (2013.01); *C08F 8/30* (2013.01)

(58) Field of Classification Search
CPC .......... C08F 36/06; C08F 136/06; C08F 8/30; C08F 4/52; C08F 4/14; C08F 4/602; C08F 4/545
See application file for complete search history.

(56) References Cited

U.S. PATENT DOCUMENTS

| | | | | |
|---|---|---|---|---|
| 5,017,539 | A * | 5/1991 | Jenkins | C08F 136/06 502/102 |
| 6,437,205 | B1 | 8/2002 | Miller et al. | |
| 6,977,281 | B1 * | 12/2005 | Ozawa | C08C 19/44 525/105 |
| 9,150,671 | B2 | 10/2015 | Qin et al. | |
| 10,253,119 | B2 * | 4/2019 | Kim | C08F 136/06 |
| 2006/0004131 | A1 | 1/2006 | Ozawa et al. | |
| 2006/0030677 | A1 | 2/2006 | Ozawa et al. | |
| 2008/0182954 | A1 | 7/2008 | Luo et al. | |
| 2009/0171046 | A1 * | 7/2009 | Luo | C08L 9/00 526/135 |
| 2009/0292043 | A1 | 11/2009 | Kurazumi et al. | |
| 2009/0299019 | A1 | 12/2009 | Luo et al. | |
| 2010/0190940 | A1 | 7/2010 | Nakagawa et al. | |
| 2014/0378620 | A1 | 12/2014 | Iwase et al. | |
| 2015/0299350 | A1 | 10/2015 | Qin et al. | |
| 2017/0275391 | A1 * | 9/2017 | Kim | C07F 5/068 |
| 2017/0275401 | A1 | 9/2017 | Oh et al. | |

FOREIGN PATENT DOCUMENTS

| | | | |
|---|---|---|---|
| EP | 0375421 A1 | 6/1990 | |
| EP | 3106473 A1 | 12/2016 | |
| EP | 3222640 A1 | 9/2017 | |
| JP | 2002544342 A | 12/2002 | |
| JP | 2003514078 A | 4/2003 | |
| JP | 2003514079 A | 4/2003 | |
| JP | 2004513987 A | 5/2004 | |
| JP | 2008163338 A | 7/2008 | |
| JP | 2009185280 A | 8/2009 | |
| JP | 2012097271 A | 5/2012 | |
| JP | 2012531494 A | 12/2012 | |
| JP | 5340556 B2 | 11/2013 | |
| JP | 2014169448 A | 9/2014 | |
| JP | 2015508843 A | 3/2015 | |
| JP | 2016006189 A | 1/2016 | |
| KR | 20070119092 A | 12/2007 | |
| KR | 20080063191 A | 7/2008 | |
| KR | 20090073986 A | 7/2009 | |
| KR | 20160060562 A | 5/2016 | |
| KR | 20160073924 A | 6/2016 | |
| WO | 2008146643 A1 | 12/2008 | |
| WO | 2013115242 A1 | 8/2013 | |
| WO | WO-2016080764 A1 * | 5/2016 | .......... C08F 4/619 |
| WO | WO-2016080766 A1 * | 5/2016 | .......... C08F 2/38 |

OTHER PUBLICATIONS

International Search Report from Application No. PCT/KR2018/013790 dated Feb. 19, 2019, 3 pages.
Supplementary European Search Report from EP18880439 dated Oct. 23, 2020, 7 pages.

* cited by examiner

*Primary Examiner* — Robert C Boyle
(74) *Attorney, Agent, or Firm* — Lerner, David, Littenberg, Krumholz & Mentlik, LLP

(57) ABSTRACT

A conjugated diene-based polymer catalyzed with a lanthanide rare earth element, and having high linearity and improved compounding properties, and a method for preparing the same are provided. The conjugated diene-based polymer catalyzed with a lanthanide rare earth element has high linearity, and if applied to a rubber composition, may show excellent processability, tensile strength and viscoelasticity.

5 Claims, No Drawings

CONJUGATED DIENE-BASED POLYMER AND METHOD FOR PREPARING THE SAME

CROSS-REFERENCE TO RELATED APPLICATIONS

The present application is a national stage entry under 35 U.S.C. § 371 of International Application No. PCT/KR2018/013790 filed on Nov. 13, 2018, which claims priority to Korean Patent Application No. 10-2017-0156567, filed on Nov. 22, 2017, the entire contents of which are incorporated herein by reference.

TECHNICAL FIELD

The present invention relates to a conjugated diene-based polymer catalyzed with a lanthanide rare earth element and having high linearity and improved compounding properties, and a method for preparing the same.

BACKGROUND ART

Recently, according to the growing attention on energy saving and environmental issues, the decrease of the fuel consumption ratio of cars is required. As a method for accomplishing the requirement, a method for decreasing the heating properties of tires using an inorganic filler such as silica and carbon black in a rubber composition for forming tires has been suggested. However, the dispersion of the inorganic filler in the rubber composition is not favorable, and defects of degrading overall physical properties of the rubber composition such as abrasion resistance, crack resistance and processability arise.

In order to solve such defects, a method of modifying the polymerization active part of a conjugated diene-based polymer which is obtained by anionic polymerization using organolithium with a functional group which is capable of interacting with an inorganic filler, has been developed as a method for increasing the dispersibility of the inorganic filler such as silica and carbon black in a rubber composition. Particularly, a method of modifying the polymerization active terminal of a conjugated diene-based polymer with a tin-based compound, a method of introducing an amino group, or a method of modifying with an alkoxysilane derivative has been suggested.

However, if a rubber composition is prepared using a modified conjugated diene-based polymer which is modified by the above-described methods, low heating properties may be secured, but the improving effects of the physical properties of a rubber composition such as abrasion resistance and processability were insufficient.

As another method, in a living polymer obtained by coordination polymerization using a catalyst including a lanthanide rare earth element compound, a method of modifying a living active terminal using a specific coupling agent or a modifier has been developed. However, in the conventionally known catalyst including a lanthanide rare earth element compound, the activity of the living terminal thus obtained is weak, and the modification ratio of the terminal is low, and thus, the improving effects of the physical properties of a rubber composition is insignificant.

DISCLOSURE OF THE INVENTION

Technical Problem

The present invention has been devised to solve the above-mentioned problems of the conventional technique, and an object of the present invention is to provide a conjugated diene-based polymer catalyzed with a lanthanide rare earth element and having high linearity and improved compounding properties.

In addition, another object of the present invention is to provide a method for preparing the conjugated diene-based polymer.

Technical Solution

To solve the above-described tasks, there is provided in the present invention a conjugated diene-based polymer catalyzed with a lanthanide rare earth element and having a ratio ((−S/R)/MWD) of a stress/relaxation (S/R) value at 100° C. and molecular weight distribution (MWD) of 0.30 or more.

Also, there is provided in the present invention a method for preparing the conjugated diene-based polymer including polymerizing a conjugated diene-based monomer in the presence of a lanthanide rare earth element catalyst composition to prepare an active polymer including an organometal part, wherein the lanthanide rare earth element catalyst composition includes a lanthanide rare earth element-containing compound, a first alkylating agent, a second alkylating agent, a halide and a conjugated diene-based monomer in a molar ratio of 1:100 to 200:40 to 60:2 to 4:20 to 50.

Advantageous Effects

The conjugated diene-based polymer catalyzed with a lanthanide rare earth element according to the present invention has high linearity, and thus may be applied to a rubber composition to show excellent processability, tensile strength and viscoelasticity.

In addition, in the preparation method according to an embodiment of the present invention, a conjugated diene-based polymer having high linearity may be prepared by polymerizing a conjugated diene-based monomer using a catalyst composition including a lanthanide rare earth element-containing compound, a first alkylating agent, a second alkylating agent, a halide and a conjugated diene-based monomer in a specific ratio.

BEST MODE FOR CARRYING OUT THE INVENTION

Hereinafter, the present invention will be described in more detail in order to assist the understanding of the present invention.

It will be understood that words or terms used in the description and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "substituted" used in the present invention may mean that the hydrogen of a functional group, an atomic group or a compound is substituted with a specific substituent. If the hydrogen of a functional group, an atomic group or a compound is substituted with a specific substituent, one or a plurality including two or more substituents may be present according to the number of hydrogen present in the functional group, the atomic group or the compound, and if a plurality of substituents are present, each substituent may be the same or different.

The term "alkyl group" used in the present invention may mean monovalent aliphatic saturated hydrocarbon, and may include both linear alkyl group such as methyl, ethyl, propyl and butyl, and branched alkyl group such as isopropyl, sec-butyl, tert-butyl and neo-pentyl.

The term "cycloalkyl group" used in the present invention may mean cyclic saturated hydrocarbon, or cyclic unsaturated hydrocarbon including one, two or more unsaturated bonds.

The term "aryl group" used in the present invention may mean cyclic aromatic hydrocarbon, and may include both monocyclic aromatic hydrocarbon in which one ring us formed, and polycyclic aromatic hydrocarbon in which two or more rings are combined.

The term "single bond" used in the present invention may mean a single covalent bond itself, which does not include a separate atomic or molecular group.

The present invention provides a conjugated diene-based polymer catalyzed with a lanthanide rare earth element and having high linearity.

The conjugated diene-based polymer according to an embodiment of the present invention is characterized in having a ratio ((−S/R)/MWD) of a stress/relaxation (S/R) value at 100° C. and molecular weight distribution (MWD) of 0.30 or more.

In addition, the conjugated diene-based polymer according to another embodiment of the present invention may have a ratio ((−S/R)/MWD) of a stress/relaxation (S/R) value at 100° C. and molecular weight distribution (MWD) of 0.30 or more, and include a functional group derived from a modifier represented by the following Formula 4 or Formula 5:

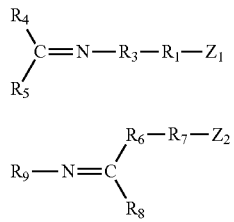

[Formula 4]

[Formula 5]

in Formula 4 or Formula 5, $Z_1$ and $Z_2$ are each independently a silane group, N,N-2 substituted aminophenyl group, an imine group or a cyclic amino group, $R_1$ and $R_7$ are each independently a single bond or a divalent organic group, $R_3$ and $R_6$ are each independently a single bond or a divalent organic group; or $R_3$ and $R_6$ may be trivalent organic groups which are connected with $R_4$ or $R_5$, and $R_8$ or $R_9$, respectively, to form rings, $R_4$ and $R_8$ are each independently a monovalent organic group; or $R_4$ and $R_8$ may be divalent organic groups which are connected with $R_3$ or $R_5$, and $R_6$ or $R_9$, respectively, to form rings, and $R_5$ is a monovalent organic group; or a divalent organic group which is connected with $R_3$ or $R_4$ to form a ring.

The conjugated diene-based polymer according to an embodiment of the present invention may have optimized properties such as molecular weight distribution and mooney viscosity to improve the balance of physical properties such as viscoelasticity, tensile properties and processability, and high linearity of a rubber composition prepared in the presence of a catalyst composition which will be described later and thus including the same.

Particularly, the conjugated diene-based polymer may have a ratio ((−S/R)/MWD) of a −stress/relaxation (−S/R) value at 100° C. and molecular weight distribution (MWD) of 0.30 or more, particularly, 0.30 to 0.50.

Here, the ratio ((−S/R)/MWD) of a −stress/relaxation (−S/R) value and molecular weight distribution (MWD) represents molecular weight distribution with respect to −S/R, and from the ratio, the linearity of a polymer may be predicted. For example, if the ratio of the −S/R and the molecular weight distribution decreases, the linearity of a polymer may decrease, and if the linearity decreases, if applied to a rubber composition, viscoelasticity may be degraded. Since the conjugated diene-based polymer according to an embodiment of the present invention has the ratio of the −S/R value and the molecular weight distribution in the above-described range, if applied to a rubber composition, viscoelasticity may be excellent.

In the present invention, the −S/R value represents a stress change shown in response to the same amount of strain, and was measured using a mooney viscosity system, for example, a Large Rotor of MV2000E of Monsanto Co. in the conditions of 100° C. and a rotor speed of 2±0.02 rpm. Particularly, a polymer was stood at room temperature (23±5° C.) for 30 minutes or more, and 27±3 g of the specimen was collected and put in a die cavity, and then, platen was operated to measure the mooney viscosity while applying torque. In addition, the −S/R value (absolute value) was obtained by measuring the gradient value of the mooney viscosity change appearing during releasing the torque. The conjugated diene-based polymer may have molecular weight distribution (Mw/Mn) of 1.5 to 3.5, and particularly, the conjugated diene-based polymer may have narrow molecular weight distribution (Mw/Mn) of 2.0 to 3.0. If the molecular weight distribution is narrow as described above, excellent effects of tensile properties and viscoelasticity may be achieved, if applied to a rubber composition. The molecular weight distribution may be, for example, 2.0 to 2.8, or 2.0 to 2.6. In the present invention, the molecular weight distribution of the conjugated diene-based polymer may be calculated as the ratio (Mw/Mn) of the weight average molecular weight (Mw) to the number average molecular weight (Mn). In this case, the number average molecular weight (Mn) is a common average of the molecular weight of individual polymer, which is calculated by measuring the molecular weights of n polymer molecules, obtaining the total of the molecular weights, and dividing the total by n, and the weight average molecular weight (Mw) represents molecular weight distribution of a polymer composition. All molecular weight average values may be represented by gram per mole (g/mol). The weight average molecular weight and the number average molecular weight may mean polystyrene conversion molecular weights analyzed by gel permeation chromatography (GPC), respectively.

The conjugated diene-based polymer according to an embodiment of the present invention may satisfy the above-described molecular weight distribution conditions and at the same time may have a weight average molecular weight (Mw) of $4 \times 10^5$ to $1.0 \times 10^6$ g/mol and a number average molecular weight (Mn) of $2.0 \times 10^5$ to $5.0 \times 10^5$ g/mol. Within these ranges, if applied to a rubber composition, tensile properties may be remarkable and processability may be excellent, and workability of the rubber composition may be improved, mixing and kneading may become easy, and the mechanical properties and balance of physical properties of the rubber composition may be excellent. For example, the weight average molecular weight may be $4.5 \times 10^5$ to $1.0 \times 10^6$ g/mol, or 5.0×10⁵ to 1.0×10⁶ g/mol, and the number average molecular weight may be 2.0×10⁵ to 4.5×10⁵ g/mol, or 2.0×10⁵ to 4.0×10⁵ g/mol.

More particularly, if the conjugated diene-based polymer according to an embodiment of the present invention satisfy the molecular weight distribution together with the conditions of the weight average molecular weight (Mw) and the number average molecular weight (Mn) at the same time, if applied to a rubber composition, the tensile properties, viscoelasticity and processability of the rubber composition may be excellent, and the balance among the physical properties may be excellent.

In addition, the conjugated diene-based polymer according to an embodiment of the present invention may have a mooney viscosity (MV) at 100° C. of 30 to 70, and within this range, even better processability may be achieved. The mooney viscosity at 100° C. may be, for example, 40 to 60.

In the present invention, the mooney viscosity may be measured using a mooney viscosity system, for example, MV2000E manufactured by Monsanto Co. using Large Rotor at 100° C. at a rotor speed of 2±0.02 rpm. In this case, a specimen used may be stood at room temperature (23±3° C.) for minutes or more, and 27±3 g of the specimen may be collected and put in a die cavity, and then, the mooney viscosity may be measured by operating Platen.

In addition, the conjugated diene-based polymer may have the cis-1,4 bond content of a conjugated diene part of 95% or more, more particularly, 97% or more, if measured by Fourier transform infrared spectroscopy (FT-IR). Accordingly, if applied to a rubber composition, the abrasion resistance, crack resistance and ozone resistance of the rubber composition may be improved.

In addition, the conjugated diene-based polymer may have the vinyl content of a conjugated diene part of 5% or less, more particularly, 3% or less, even more particularly, 1% or less, if measured by Fourier transform infrared spectroscopy. If the vinyl content in the polymer is greater than 5%, the abrasion resistance, crack resistance and ozone resistance of a rubber composition including the same may be degraded.

Here, each of the cis-1,4 bond content and the vinyl content in the polymer by the Fourier transform infrared spectroscopy (FT-IR) is obtained by measuring FT-IR transmittance spectrum of the carbon disulfide solution of a conjugated diene-based polymer, that is prepared at a concentration of 5 mg/ml with carbon disulfide of the same cell as a blank, and using the maximum peak value around 1130 cm⁻¹ (a, base line) of the measured spectrum, the minimum peak value around 967 cm⁻¹ (b) showing a trans-1,4 bond, the minimum peak value around 911 cm⁻¹ (c) showing a vinyl bond, and the minimum peak value around 736 cm⁻¹ (d) showing a cis-1,4 bond.

In addition, the conjugated diene-based polymer catalyzed with a lanthanide rare earth element in the present invention may represent a conjugated diene-based polymer including an organometal part which is derived from a catalyst composition including a lanthanide rare earth element-containing compound, i.e., activated from a catalyst.

In addition, the conjugated diene-based polymer according to an embodiment of the present invention may be a butadiene homopolymer such as polybutadiene, or a butadiene copolymer such as a butadiene-isoprene copolymer.

In a particular embodiment, the conjugated diene-based polymer may include 80 to 100 wt % of a repeating unit derived from a 1,3-butadiene monomer, and 20 wt % or less of a repeating unit derived from other conjugated diene-based monomers which are selectively copolymerizable with 1,3-butadiene. Within the range, the 1,4-cis bond content in the polymer may not decrease. In this case, the 1,3-butadiene monomer may include 1,3-butadiene or the derivatives thereof such as 1,3-butadiene, 2,3-dimethyl-1,3-butadiene and 2-ethyl-1,3-butadiene, and the other conjugated diene-based monomers which are copolymerizable with 1,3-butadiene may include 2-methyl-1,3-pentdiene, 1,3-pentadiene, 3-methyl-1,3-pentadiene, 4-methyl-1,3-pentadiene, 1,3-hexadiene or 2,4-hexadiene, and any one, or two or more among them may be used.

According to an embodiment of the present invention, the conjugated diene-based polymer may particularly be a butadiene-based polymer catalyzed with neodymium, including a repeating unit derived from a 1,3-butadiene monomer.

In the present invention, the activated organometal part of the conjugated diene-based polymer may be an activated organometal part at the terminal of the conjugated diene-based polymer (an activated organometal part at the terminal of a molecular chain), an activated organometal part at the main chain thereof, or an activated organometal part at the side chain thereof. Among them, in case where an activated organometal part of a conjugated diene-based polymer is obtained by anionic polymerization or coordination anionic polymerization, the activated organometal part may be an activated organometal part at the terminal.

Particularly, the lanthanide rare earth element catalyst may include a neodymium compound represented by the following Formula 1:

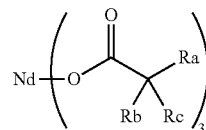

[Formula 1]

in Formula 1, $R_a$ to $R_c$ are each independently hydrogen, or an alkyl group of 1 to 12 carbon atoms, where $R_a$ to $R_c$ are not hydrogen at the same time.

Particularly, the neodymium compound may be one or more selected from the group consisting of Nd(2-ethyl hexanoate)₃, Nd(neodecanoate)₃, Nd(2-ethylhexanoate)₃, Nd(2,2-diethyl decanoate)₃, Nd(2,2-dipropyl decanoate)₃, Nd(2,2-dibutyl decanoate)₃, Nd(2,2-dihexyl decanoate)₃, Nd(2,2-dioctyl decanoate)₃, Nd(2-ethyl-2-propyl decanoate)₃, Nd(2-ethyl-2-butyl decanoate)₃, Nd(2-ethyl-2-hexyl decanoate)₃, Nd(2-propyl-2-butyl decanoate)₃, Nd(2-propyl-2-hexyl decanoate)₃, Nd(2-propyl-2-isopropyl decanoate)₃, Nd(2-butyl-2-hexyl decanoate)₃, Nd(2-hexyl-2-octyl decanoate)₃, Nd(2-t-butyl decanoate)₃, Nd(2,2-diethyl octanoate)₃, Nd(2,2-dipropyl octanoate)₃, Nd(2,2-dibutyl octanoate)₃, Nd(2,2-dihexyl octanoate)₃, Nd(2-ethyl-2-propyl octanoate)₃, Nd(2-ethyl-2-hexyl octanoate)₃, Nd(2,2-diethyl nonanoate)₃, Nd(2,2-dipropyl nonanoate)₃, Nd(2,2-dibutyl nonanoate)₃, Nd(2,2-dihexyl nonanoate)₃, Nd(2-ethyl-2-propyl nonanoate)₃ and Nd(2-ethyl-2-hexyl nonanoate)₃.

In addition, the present invention provides a method for preparing a conjugated diene-based polymer catalyzed with a lanthanide rare earth element.

The method for preparing a conjugated diene-based polymer according to an embodiment of the present invention is characterized in including polymerizing a conjugated diene-based monomer in the presence of a lanthanide rare earth element catalyst composition to prepare an active polymer including an organometal part (Step A), wherein the lanthanide rare earth element catalyst composition includes a lanthanide rare earth element-containing compound, a first alkylating agent, a second alkylating agent, a halide and a conjugated diene-based monomer in a molar ratio of 1:100 to 200:40 to 60:2 to 4:20 to 50.

In the method for preparing the conjugated diene-based polymer according to an embodiment of the present invention, a conjugated diene-based polymer having high linearity may be prepared by polymerizing a conjugated diene-based monomer using the catalyst composition.

Step A is a step of polymerizing a conjugated diene-based monomer to prepare an active polymer including an organometal part, and may be performed by polymerizing a conjugated diene-based monomer in the presence of a lanthanide rare earth element catalyst composition.

Here, the lanthanide rare earth element catalyst composition may include a lanthanide rare earth element-containing compound, a first alkylating agent, a second alkylating agent, a halide and a conjugated diene-based monomer, and in this case, the lanthanide rare earth element-containing compound, the first alkylating agent, the second alkylating agent, the halide and the conjugated diene-based monomer may have a molar ratio of 1:100 to 200:40 to 60:2 to 4:20 to 50. Particularly, the lanthanide rare earth element-containing compound, the first alkylating agent, the second alkylating agent, the halide and the conjugated diene-based monomer may have a molar ratio of 1:100 to 150:40 to 50:2 to 3:20 to 30.

In addition, the lanthanide rare earth element catalyst composition may be prepared by mixing the lanthanide rare earth element-containing compound, the first alkylating agent, the second alkylating agent, the halide and the conjugated diene-based monomer at a temperature of −30° C. to −20° C. and then, standing at a temperature of −30° C. to −20° C. for 24 hours to 36 hours.

Particularly, the lanthanide rare earth element catalyst composition may be prepared by injecting the lanthanide rare earth element-containing compound, the first alkylating agent, the second alkylating agent, the halogen compound and selectively the conjugated diene-based monomer into a hydrocarbon-based solvent in order. In this case, the hydrocarbon-based solvent may be a nonpolar solvent having no reactivity with constituent components of the catalyst composition. Particularly, the hydrocarbon-based solvent may use one or more selected from the group consisting of aliphatic hydrocarbon-based solvents such as pentane, hexane, isopentane, heptane, octane and isooctane; cycloaliphatic hydrocarbon-based solvents such as cyclopentane, methylcyclopentane, cyclohexane, methylcyclohexane and ethylcyclohexane; or aromatic hydrocarbon-based solvents such as benzene, toluene, ethylbenzene and xylene. Particular example of the hydrocarbon-based solvent may be the aliphatic hydrocarbon-based solvent such as hexane.

The lanthanide rare earth element catalyst composition according to an embodiment of the present invention has the above-mentioned composition and is prepared as above, and an active polymer having high linearity may be prepared.

In addition, catalyst activity may be improved, and further, the conjugated diene-based polymer thus prepared may be stabilized by premixing a portion of the conjugated diene-based monomer used for the polymerization reaction with the catalyst composition and using in a preforming catalyst composition type.

The "preforming" in the present invention may mean pre-polymerization in a catalyst system by the addition of butadiene, in case where diisobutylaluminum hydride (DIBAH), etc. is included in a catalyst composition, i.e., a catalyst system, and a small amount of a conjugated diene-based monomer such as butadiene is added to reduce the production possibility of various catalyst species therewith. In addition, the "premix" means a homogenously mixed state of each of compounds without being polymerized in a catalyst system.

In a particular embodiment, the conjugated diene-based monomer may be one or more selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene and 2,4-hexadiene. The conjugated diene-based monomer used for preparing the catalyst composition may be a partial amount within the total amount range of the conjugated diene-based monomer used for the polymerization reaction.

The lanthanide rare earth element-containing compound may be one among rare earth elements with atomic number of 57 to 71 such as neodymium, praseodymium, cerium, lanthanum and gadolinium, or a compound including two or more elements thereof, more particularly, a compound including neodymium.

In another embodiment, the lanthanide rare earth element-containing compound may be a soluble salt in a hydrocarbon solvent, such as the carboxylate, alkoxide, β-diketone complex, phosphate and phosphite of a lanthanide rare earth element, particularly, a neodymium-containing carboxylate.

The hydrocarbon solvent may be, for example, saturated aliphatic hydrocarbon of 4 to 10 carbon atoms, such as butane, pentane, hexane and heptane; saturated alicyclic hydrocarbon of 5 to 20 carbon atoms, such as cyclopentane and cyclohexane; monoolefins such as 1-butene and 2-butene, aromatic hydrocarbon such as benzene, toluene and xylene; or halogenated hydrocarbon such as methylene chloride, chloroform, trichloroethylene, perchloroethylene, 1,2-dichloroethane, chlorobenzene, bromobenzene and chlorotoluene.

According to an embodiment of the present invention, the lanthanide rare earth element-containing compound may include a neodymium compound represented by the following Formula 1:

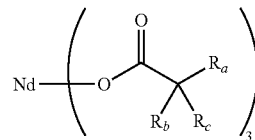

[Formula 1]

in Formula 1, $R_a$ to $R_c$ are the same as defined above.

In another embodiment, considering excellent solubility in a polymerization solvent without fear of oligomerization, and conversion ratio to catalyst active species, and consequential excellent improving effect of catalyst activity, the lanthanide rare earth element-containing compound may be a neodymium-based compound, more particularly, Formula 1 where $R_a$ is a linear or branched alkyl group of 4 to 12 carbon atoms, and $R_b$ and $R_c$ are each independently hydrogen or an alkyl group of 2 to 8 carbon atoms, where $R_b$ and $R_c$ are not hydrogen at the same time.

In a more particular embodiment, in Formula 1, $R_a$ may be a linear or branched alkyl group of 6 to 8 carbon atoms, and $R_b$ and $R_c$ may be each independently hydrogen or an alkyl group of 2 to 6 carbon atoms, where $R_b$ and $R_c$ may not be hydrogen at the same time, and the particular examples of the neodymium compound may include one or more selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2-t-butyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$ and Nd(2-ethyl-2-hexyl nonanoate)$_3$, and among them, the neodymium compound may be one or more selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, and Nd(2,2-dioctyl decanoate)$_3$.

More particularly, in Formula 1, $R_a$ may be a linear or branched alkyl group of 6 to 8 carbon atoms, and $R_b$ and $R_c$ may be each independently an alkyl group of 2 to 6 carbon atoms.

As described above, the neodymium compound represented by Formula 1 includes a carboxylate ligand containing an alkyl group having various lengths of two or more carbon atoms at an α position as a substituent, and steric change may be induced around a neodymium central metal to block the tangling among compounds, and as a result, the restraining effect of oligomerization may be achieved. Also, such a neodymium compound has high solubility in a polymerization solvent, and the ratio of neodymium positioned at the central part, which has difficulty in conversion into a catalyst active species, is decreased, and thus, a conversion ratio into the catalyst active species is high.

In another embodiment, the weight average molecular weight (Mw) of the neodymium compound represented by Formula 1 may be 600 to 2000 g/mol. With the weight average molecular weight in the above-mentioned range, excellent catalyst activity may be shown more stably.

In addition, the lanthanide rare earth element-containing compound may have, for example, a solubility of about 4 g or more per 6 g of a non-polar solvent at room temperature (25° C.). In the present invention, the solubility of the lanthanide rare earth element-containing compound means the degree of clear dissolution without generating turbid phenomenon. Through such high solubility, excellent catalyst activity may be attained.

The lanthanide rare earth element-containing compound may be used, for example, in an amount of 0.1 to 0.5 mmol, more particularly, 0.1 to 0.2 mmol per 100 g of the conjugated diene-based monomer used for polymerization, and within this range, catalyst activity is high, appropriate catalyst concentration is attained, and a separate demineralization process is not necessary.

The lanthanide rare earth element-containing compound may be used as a reaction product type with a Lewis base.

Due to the Lewis base, the reaction product may attain improved solubility of the lanthanide rare earth element-containing compound in a solvent and may attain the effect of stable storage for a long time. The Lewis base may be used in a ratio of 30 mol or less, or 1 to 10 mol per 1 mol of a rare earth element. The Lewis base may be, for example, acetyl acetone, tetrahydrofuran, pyridine, N,N-dimethylformamide, thiophene, diphenyl ether, triethylamine, organophosphorous compounds or monohydric or dihydric alcohols.

The first alkylating agent may be aluminoxane, and the aluminoxane may be prepared by reacting trihydrocarbyl aluminum-based compounds with water. Particularly, the aluminoxane may be linear aluminoxanes represented by the following Formula 2a or circular aluminoxanes represented by the following Formula 2b:

[Formula 2a]

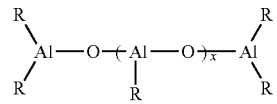

[Formula 2b]

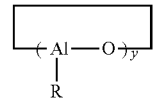

In Formulae 2a and 2b, R is a monovalent organic group which is combined with an aluminum atom via a carbon atom and is the same as the hydrocarbyl group, x and y may be each independently an integer of 1 or more, particularly, 1 to 100, and more particularly, an integer of 2 to 50.

More particularly, the aluminoxane may be, methylaluminoxane (MAO), modified methylaluminoxane (MAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane or 2,6-dimethylphenyl aluminoxane, and any one or a mixture of at least two thereof may be used.

In addition, the modified methylaluminoxane is obtained by substituting the methyl group of the methylaluminoxane with a modifier (R), particularly, a hydrocarbon group of 2 to 20 carbon atoms, and particularly, may be a compound represented by the following Formula 3:

[Formula 3]

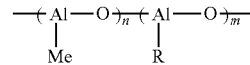

In Formula 3, R is the same as defined above, and m and n may be an integer of 2 or more. In addition, in Formula 3, Me means a methyl group.

Particularly, R in Formula 3 may be an alkyl group of 2 to 20 carbon atoms, a cycloalkyl group of 3 to 20 carbon atoms, an alkenyl group of 2 to 20 carbon atoms, a cycloalkenyl group of 3 to 20 carbon atoms, an aryl group of 6 to 20 carbon atoms, an arylalkyl group of 7 to 20 carbon atoms, an alkylaryl group of 7 to 20 carbon atoms, an allyl group or an alkynyl group of 2 to 20 carbon atoms, and more particularly, may be an alkyl group of 2 to 10 carbon atoms such as an ethyl group, an isobutyl group, a hexyl group and an octyl group, and even more particularly, may be an isobutyl group.

More particularly, the modified methylaluminoxane may be obtained by substituting about 50 mol % to 90 mol % of the methyl group of the methylaluminoxane with the hydrocarbon group. If the amount of the hydrocarbon group substituted in the modified methylaluminoxane is in the above-mentioned range, alkylation may be promoted and catalyst activity may increase.

Such modified methylaluminoxane may be prepared by a common method, and particularly, may be prepared using trimethylaluminum and an alkylaluminum other than trimethylaluminum. In this case, the alkylaluminum may be triisobutylaluminum, triethylaluminum, trihexylaluminum, or trioctylaluminum, and any one or a mixture of two or more thereof may be used.

The second alkylating agent may be hydrocarbylaluminum dihydride, and particularly, the second alkylating agent may include one or more selected from the group consisting of dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride; ethylaluminum dihydride, n-propylaluminum dihydride, isopropylaluminum dihydride, n-butylaluminum dihydride, isobutylaluminum dihydride, and n-octylaluminum dihydride.

Meanwhile, in the catalyst composition according to an embodiment of the present invention, the alkylating agent is an organometal compound which is capable of transporting a hydrocarbyl group to another metal, and may act as a co-catalyst.

In addition, the catalyst composition according to an embodiment of the present invention may further include a common alkylating agent used as an alkylating agent during preparing a common conjugated diene-based polymer in addition to the first and second alkylating agent, as necessary. Such an alkylating agent may include alkylaluminum such as trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; and alkylmagnesium compound such as diethylmagnesium, di-n-propylmagnesium, diisopropylmagnesium, dibutylmagnesium, dihexylmagnesium, diphenylmagnesium, and dibenzylmagnesium. Also, the organolithium compound may include an alkyllithium compound such as n-butyllithium.

In addition, the halogen compound may be, without specific limitation, a diatomic halogen, an interhalogen compound, hydrogen halide, organic halide, nonmetal halide, metal halide, or organometallic halide, etc., and any one or a mixture of two or more thereof may be used. Among them, in consideration of the improvement of catalyst activity and consequent improving effect of reactivity, the halogen compound may be any one selected from the group consisting of an organic halide, a metal halide and an organometallic halide, or a mixture of two or more thereof.

The diatomic halogen may include fluorine, chlorine, bromine, or iodine.

In addition, the interhalogen compound may particularly include iodine monochloride, iodine monobromide, iodine trichloride, iodine pentafluoride, iodine monofluoride, iodine trifluoride, etc.

In addition, the hydrogen halide may include hydrogen fluoride, hydrogen chloride, hydrogen bromide, or hydrogen iodide.

In addition, the organic halide may include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as "iodoform"), tetraiodomethane, 1-iodopropane, 2-iodopropane, 1,3-diiodopropane, t-butyl iodide, 2,2-dimethyl-1-iodopropane (also referred to as "neopentyl iodide"), allyl iodide, iodobenzene, benzyl iodide, diphenylmethyl iodide, triphenylmethyl iodide, benzylidene iodide (also referred to as "benzal iodide"), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, methyl iodoformate, or the like.

In addition, the nonmetal halide may include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride (SiCl$_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphor triiodide, phosphor oxyiodide or selenium tetraiodide.

In addition, the metal halide may include tin tetrachloride, tin tetrabromide, aluminum trichloride, aluminum tribromide, antimony trichloride, antimony pentachloride, antimony tribromide, aluminum tribromide, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide or magnesium diiodide.

In addition, the organometallic halide may include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, di-t-butyltin diiodide, or the like.

In addition, the catalyst composition according to an embodiment of the present invention may include a non-coordinating anion-containing compound or a non-coordinating anion precursor compound together with the halogen compound instead of the halogen compound.

Particularly, in the compound containing a non-coordinating anion, the non-coordinating anion may be an anion not forming a coordination bond with the active center of a catalyst system due to steric hindrance and having a sterically large volume, and may be a tetraarylborate anion or a tetraarylborate fluoride anion. In addition, the compound containing a non-coordinating anion may include a carbonium cation such as a triaryl carbonium cation; an ammonium cation such as a N,N-dialkyl anilinium cation, or a counter cation such as a phosphonium cation together with the non-coordinating anion. More particularly, the compound containing the non-coordinating anion may be triphenylcarbonium tetrakis(pentafluorophenyl)borate, N,N-dimethylanilinium tetrakis(pentafluorophenyl)borate, triphenylcarbonium tetrakis[3,5-bis(trifluoromethyl) phenyl]borate, N,N-dimethylanilinium tetrakis[3,5-bis(trifluoromethyl)phenyl]borate, or the like.

In addition, as the non-coordinating anion precursor, a triaryl boron compound ($BE_3$, where E is a strongly electron withdrawing aryl group such as a pentafluorophenyl group and a 3,5-bis(trifluoromethyl)phenyl group) may be used as a compound capable of forming a non-coordinating anion under reaction conditions.

The polymerization of step A may be performed by radical polymerization and in a particular embodiment, may be performed by bulk polymerization, solution polymerization, suspension polymerization or emulsion polymerization, more particularly, solution polymerization. In another embodiment, the polymerization reaction may be performed by any method among a batch type method and a continuous type method. In a particular embodiment, the polymerization reaction for preparing the conjugated diene-based polymer may be performed by injecting a conjugated diene-based monomer to the catalyst composition and reacting in an organic solvent.

In another embodiment, the polymerization may be performed in a hydrocarbon-based solvent. The hydrocarbon-based solvent may be additionally added to the amount of the hydrocarbon-based solvent which may be used for preparing the catalyst composition. In this case, the hydrocarbon-based solvent may be the same as described above. Also, in case where the hydrocarbon-based solvent is used, the concentration of the monomer may be 3 to 80 wt %, or 10 to 30 wt %.

According to an embodiment of the present invention, during the polymerization reaction for preparing the active polymer, additives such as a reaction quenching agent for finishing polymerization reaction, such as polyoxyethylene glycol phosphate; and an antioxidant such as 2,6-di-t-butylparacresol, may be further used. In addition, additives generally serving easy solution polymerization, particularly, additives such as a chelating agent, a dispersant, a pH controlling agent, a deoxidizer, and an oxygen scavenger may be used.

In another embodiment, the polymerization reaction for preparing he active polymer may be performed at a temperature of 20 to 200° C., or 20 to 100° C. for 15 minutes to 3 hours, or 30 minutes to 2 hours. Within the ranges, reaction control may be easy, polymerization reaction rate and efficiency may be excellent, and the cis-1,4 bond content of the active polymer thus prepared may be high. In addition, in the polymerization reaction, preferably, the mixing of a compound having deactivating action such as oxygen, water and carbonic acid gas in a polymerization reaction system may be prevented so as not to deactivate the catalyst composition and a polymer including the lanthanide rare earth element compound.

As a result of such polymerization reaction, an active polymer including an organometal part activated from a catalyst including the lanthanide rare earth element-containing compound, more particularly, a conjugated diene-based polymer catalyzed with neodymium including 1,3-butadiene monomer unit may be produced, and the conjugated diene-based polymer thus prepared may have pseudo-living properties.

Meanwhile, the preparation method according to an embodiment of the present invention may further include a modification reaction step for reacting the active polymer with a modifier.

Here, the modification reaction may be performed by solution reaction or solid phase reaction, particularly, by solution reaction. In another embodiment, the modification reaction may be performed using a batch type reactor, or by a continuous type using an apparatus such as a multi-step continuous reactor and an inline mixer.

In another embodiment, the modification reaction may be performed under the same temperature and pressure conditions as a common polymerization reaction, in a particular embodiment, may be performed at a temperature of 20 to 100° C. Within this range, the viscosity of a polymer may not increase, and the activated terminal of a polymer may not be deactivated.

In addition, the modifier may be a compound capable of imparting an active polymer with a functional group or increasing molecular weight via coupling. For example, the modifier may include one or more functional groups selected from an azacyclopropane group, a ketone group, a carboxyl group, a thiocarboxyl group, a carbonate, a carboxylic anhydride, a metal carboxylate, an oxyhalide, an urea group, a thiourea group, an amide group, a thioamide group, an isocyanate group, a thioisocyanate group, a halogenated isocyano group, an epoxy group, a thioethoxy group, an imine group and a Y—Z bond (where Y is Sn, Si, Ge or P, and Z is a halogen atom), and may be a compound not including active proton and an onium salt.

In another embodiment, the modifier may be a compound represented by the following Formula 4 or Formula 5:

[Formula 4]
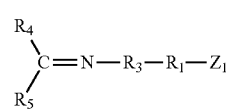

[Formula 5]
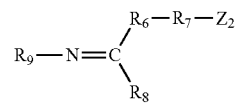

in Formula 4 or Formula 5, $Z_1$ and $Z_2$ are each independently a silane group, N,N-2 substituted aminophenyl group, an imine group or a cyclic amino group, $R_1$ and $R_7$ are each independently a single bond or a divalent organic group, $R_3$ and $R_6$ are each independently a single bond or a divalent organic group; or $R_3$ and $R_6$ may be trivalent organic groups which are connected with $R_4$ or $R_5$, and $R_8$ or $R_9$, respectively, to form rings, $R_4$ and $R_8$ are each independently a monovalent organic group; or $R_4$ and $R_8$ may be divalent organic groups which are connected with $R_3$ or $R_5$, and $R_6$ or $R_9$, respectively, to form rings, and $R_5$ is a monovalent organic group; or a divalent organic group which is connected with $R_3$ or $R_4$ to form a ring.

Particularly, the modifier represented by Formula 4 or Formula 5 may be, for example, N-(3-triethoxysilylpropyl)-4,5-dihydroimidazole, N-(1,3-dimethylbutylidene)-3-triethoxysilyl)-1-propaneamine, oligomers thereof or a mixture thereof; dimethylaminobenzylidene ethylamine, diethyl aminobenzylidene butylamine, dimethylaminobenzylidene aniline, dimethylaminobenzylidene n-butylaniline, dimethylaminobenzylidene dodecyl aniline, dimethylaminobenzylidene methoxyaniline, dimethylaminobenzylidene dimethylaminoaniline, bis(dimethylaminophenyl)methylidene butyl amine, bis(dimethylaminophenyl)methylidene n-octyl amine, bis(diethylaminophenyl)methylidenebutyl amine, bis(diethyl aminophenyl)methylidene n-octyl amine, benzylidene dimethylaminoaniline, methoxybenzylidene dimethylaminoaniline, 1-methyl-4-pentene-2-yl-methylidene dimethylaniline, 1,3-dimethylbutylidene dimethylaniline or a mixture thereof; phenylenebis(dimethylaminobenzylidene amine); benzylidene(1-hexamethyleneimino)aniline, benzylidene(1-pyrrolidino)aniline, dimethylaminobenzylidene (1-hexamethyleneimino)aniline, dimethylaminobenzylidene (1-pyrrolidino)aniline, (1-hexamethyleneimino)benzylidene aniline, (1-pyrrolidino)benzylidene aniline, benzylidene((4-n-butyl-1-piperazino)methyl)aniline, benzylidene((3-(1-methyl) pyrrolidino)methyl)aniline, ((4-n-butyl-1-piperazino)methyl)benzylideneaniline, ((3-(1-methyl) pyrrolidino)methyl)benzylidene aniline or a mixture thereof.

After finishing the modification reaction, an isopropanol solution of 2,6-di-t-butyl-p-cresol (BHT), etc. may be added to a polymerization reaction system to quench polymerization reaction. Then, desolvation treatment such as steam stripping lowering the partial pressure of a solvent via the supply of vapor, or a vacuum drying treatment may be performed to obtain a conjugated diene-based polymer. In addition, in the reaction product obtained as the result of the modification reaction, an unmodified active polymer may be included together with the modified conjugated diene-based polymer.

The method for preparing the conjugated diene-based polymer according to an embodiment of the present invention may further include precipitating and separating processes with respect to the conjugated diene-based polymer thus prepared. Filtering, separating and drying processes with respect to the precipitated conjugated diene-based polymer may be performed by common methods.

As described above, according to the method for preparing the conjugated diene-based polymer according to an embodiment of the present invention, a conjugated diene-based polymer, particularly, a butadiene-based polymer catalyzed with neodymium, having excellent physical properties as well as narrow molecular weight distribution may be prepared.

Further, the present invention provides a rubber composition including the conjugated diene-based polymer, and a molded article manufactured from the rubber composition.

The rubber composition according to an embodiment of the present invention may include the conjugated diene-based polymer in an amount of 0.1 wt % to 100 wt %, particularly, 10 wt % to 100 wt %, more particularly, 20 wt % to 90 wt %. If the amount of the conjugated diene-based polymer is less than 0.1 wt %, the improving effects of the abrasion resistance and crack resistance of a molded article, for example, a tire manufactured using the rubber composition may be insignificant.

In addition, the rubber composition may further include other rubber components in addition to the modified conjugated diene-based polymer as necessary, and in this case, the rubber components may be included in an amount of 90 wt % or less with respect to the total weight of the rubber composition. Particularly, the rubber components may be included in an amount of 1 part by weight to 900 parts by weight with respect to 100 parts by weight of the modified conjugated diene-based copolymer.

The rubber component may be a natural rubber or a synthetic rubber, for example, the rubber component may be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a polyethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acrylic rubber, a urethane rubber, a silicone rubber, an epichlorohydrin rubber and a halogenated butyl rubber, and any one or a mixture of two or more thereof may be used.

In addition, the rubber composition may include 0.1 parts by weight to 150 parts by weight of a filler with respect to 100 parts by weight of the conjugated diene-based polymer, and the filler may be a silica-based filler, carbon black or a combination thereof. Particularly, the filler may be carbon black.

The carbon black filler is not specifically limited but may be one having a nitrogen adsorption specific surface area of, for example, 20 $m^2/g$ to 250 $m^2/g$ (measured based on $N_2SA$, JIS K 6217-2:2001). Also, the carbon black may have a dibutylphthalate oil absorption amount (DBP) of 80 cc/100 g to 200 cc/100 g. If the nitrogen adsorption specific surface area of the carbon black is greater than 250 $m^2/g$, the processability of the rubber composition may be deteriorated, and if the nitrogen adsorption specific surface area of the carbon black is less than 20 $m^2/g$, reinforcing performance by the carbon black may be insignificant. In addition, if the DBP oil absorption amount of the carbon black is greater than 200 cc/100 g, the processability of the rubber composition may be deteriorated, and if the DBP oil absorption amount of the carbon black is less than 80 cc/100 g, reinforcing performance by the carbon black may be insignificant.

In addition, the silica is not specifically limited, but may include, for example, wet silica (hydrated silicate), dry silica (anhydrous silicate), calcium silicate, aluminum silicate or colloid silica. Particularly, the silica may be wet silica which has the most remarkable compatibility effect of the improving effect of destruction characteristics and wet grip. In addition, the silica may have nitrogen absorption specific surface area (nitrogen surface area per gram, $N_2SA$) of 120 $m^2/g$ to 180 $m^2/g$, and cetyl trimethyl ammonium bromide (CTAB) absorption specific surface area of 100 $m^2/g$ to 200 $m^2/g$. If the nitrogen absorption specific surface area of the silica is less than 120 $m^2/g$, the reinforcing performance due to silica may be deteriorated, and if the nitrogen absorption specific surface area of the silica is greater than 180 $m^2/g$, the processability of the rubber composition may be deteriorated. In addition, if the CTAB absorption specific surface area of the silica is less than 100 $m^2/g$, the reinforcing performance by the silica filler may be deteriorated, and if the CTAB absorption specific surface area of the silica is greater than 200 $m^2/g$, the processability of the rubber composition may be deteriorated.

Meanwhile, if the silica is used as the filler, a silane coupling agent may be used together for the improvement of reinforcing and low heating properties.

The silane coupling agent may particularly include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one among them or a mixture of two or more thereof may be used. More particularly, the silane coupling agent may be bis(3-triethoxysilylpropyl)polysulfide or 3-trimethoxysilylpropylbenzothiazyltetrasulfide in consideration of the improving effect of reinforcing properties.

In addition, the rubber composition according to an embodiment of the present invention may be sulfur crosslinkable, and so may further include a vulcanizing agent.

The vulcanizing agent may particularly be a sulfur powder and may be included in an amount of 0.1 parts by weight to 10 parts by weight with respect to 100 parts by weight of the rubber component. With the amount used in the above range, elasticity and strength required for a vulcanized rubber composition may be secured, and at the same time, a low fuel consumption ratio may be attained.

In addition, the rubber composition according to an embodiment of the present invention may further include various additives used in a common rubber industry in addition to the above-mentioned components, particularly, a vulcanization accelerator, a process oil, a plasticizer, an antiaging agent, a scorch preventing agent, a zinc white, stearic acid, a thermosetting resin, a thermoplastic resin, or the like.

The vulcanization accelerator is not specifically limited, and may particularly include a thiazole-based compound such as 2-mercaptobenzothiazole (M), dibenzothiazyldisulfide (DM), and N-cyclohexyl-2-benzothiazylsulfenamide (CZ), or a guanidine-based compound such as diphenylguanidine (DPG). The vulcanization accelerator may be included in an amount of 0.1 parts by weight to 5 parts by weight with respect to 100 parts by weight of the rubber component.

In addition, the process oil acts as a softener in a rubber composition and may particularly include a paraffin-based, naphthene-based, or aromatic compound. More particularly, an aromatic process oil may be used in consideration of tensile strength and abrasion resistance, and a naphthene-based or paraffin-based process oil may be used in consideration of hysteresis loss and properties at low temperature. The process oil may be included in an amount of 100 parts by weight or less with respect to 100 parts by weight of the rubber component. With the above-described amount range, the deterioration of the tensile strength and low exothermic properties (low fuel consumption ratio) of a vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature. The antiaging agent may be used in an amount of 0.1 parts by weight to 6 parts by weight with respect to 100 parts by weight of the rubber component.

The rubber composition according to an embodiment of the present invention may be obtained by mulling using a mulling apparatus such as a banbury mixer, a roll, and an internal mixer according to a mixing prescription. In addition, a rubber composition having low heating properties and excellent abrasion resistance may be obtained by a vulcanization process after a molding process.

Therefore, the rubber composition may be useful for the manufacture of each member of a tire such as a tire tread, an under tread, a side wall, a carcass coating rubber, a belt coating rubber, a bead filler, a chafer, and a bead coating rubber, or for the manufacture of rubber products in various industries such as a vibration-proof rubber, a belt conveyor, and a hose.

The molded article manufactured using the rubber composition may include tires or tire treads.

Hereinafter, the present invention will be explained in particular referring to embodiments. However, the embodiments below are only for illustrating the present invention, and the scope of the present invention is not limited thereto.

PREPARATION EXAMPLES

Preparation Example 1

Under nitrogen conditions, neodymium versatate (NdV, Nd(2-ethylhexanoate)$_3$) was added to a hexane solvent, and methylaluminoxane (MAO), diisobutylaluminum hydride (DIBAH), diethylaluminum chloride (DEAC) and 1,3-butadiene were added thereto one by one so that the molar ratio of NdV:MAO:DIBAH:DEAC:1,3-butadiene=1:120:43:2-3:30 was satisfied, followed by mixing at −20° C. for 12 hours to prepare a catalyst composition. The catalyst composition thus prepared was stored under nitrogen conditions at −30° C. to −20° C. for 24 hours and then used.

Preparation Example 2

Under nitrogen conditions, NdV was added to a hexane solvent, and methylaluminoxane (MAO), diisobutylaluminum hydride (DIBAH), diethylaluminum chloride (DEAC) and 1,3-butadiene were added thereto one by one so that the molar ratio of NdV:MAO:DIBAH:DEAC:1,3-butadiene=1:

150:48:2-3:30 was satisfied, followed by mixing at −20° C. for 12 hours to prepare a catalyst composition. The catalyst composition thus prepared was stored under nitrogen conditions at −30° C. to −20° C. for 24 hours and then used.

Preparation Example 3

Under nitrogen conditions, NdV was added to a hexane solvent, and methylaluminoxane (MAO), diisobutylaluminum hydride (DIBAH), diethylaluminum chloride (DEAC) and 1,3-butadiene were added thereto one by one so that the molar ratio of NdV:MAO:DIBAH:DEAC:1,3-butadiene=1: 100:40:2-3:30 was satisfied, followed by mixing at −20° C. for 12 hours to prepare a catalyst composition. The catalyst composition thus prepared was stored under nitrogen conditions at −30° C. to −20° C. for 24 hours and then used.

Comparative Preparation Example 1

Under nitrogen conditions, NdV was added to a hexane solvent, and diisobutylaluminum hydride (DIBAH), diethylaluminum chloride (DEAC) and 1,3-butadiene were added thereto one by one so that the molar ratio of NdV:DIBAH: DEAC:1,3-butadiene=1:9-10:2-3:30 was satisfied, followed by mixing at 20° C. to prepare a catalyst composition. In this case, the catalyst composition was prepared immediately before preparing a polymer and then used.

Comparative Preparation Example 2

Under nitrogen conditions, NdV was added to a hexane solvent, and methylaluminoxane (MAO), diisobutylaluminum hydride (DIBAH), diethylaluminum chloride (DEAC) and 1,3-butadiene were added thereto one by one so that the molar ratio of NdV:MAO:DIBAH:DEAC:1,3-butadiene=1: 50:33:2-3:30 was satisfied, followed by mixing at −20° C. for 12 hours to prepare a catalyst composition. The catalyst composition thus prepared was stored under nitrogen conditions at −30° C. to −20° C. for 24 hours and then used.

Comparative Preparation Example 3

Under nitrogen conditions, NdV was added to a hexane solvent, and methylaluminoxane (MAO), diisobutylaluminum hydride (DIBAH), diethylaluminum chloride (DEAC) and 1,3-butadiene were added thereto one by one so that the molar ratio of NdV:MAO:DIBAH:DEAC:1,3-butadiene=1: 120:64:2-3:30 was satisfied, followed by mixing at 20° C. for 12 hours to prepare a catalyst composition. The catalyst composition thus prepared was stored under nitrogen conditions at 20° C. for 24 hours and then used.

EXAMPLES

Example 1: Preparation of Conjugated Diene-Based Polymer

To a completely dried reactor, vacuum and nitrogen were alternately applied. To the 15 L reactor in vacuum, 4.2 kg of hexane and 500 g of 1,3-butadiene were injected, followed by elevating the temperature to 70° C. The catalyst composition of Preparation Example 1 was added thereto, and polymerization was performed for 60 minutes to prepare an active polymer. In this case, the conversion ratio of 1,3-butadiene to a polybutadiene polymer was 100%. Then, a hexane solution including 1.0 g of a polymerization quencher and a hexane solution including 2.0 g of an antioxidant were added to finish the reaction and prepare a butadiene polymer.

Example 2: Preparation of Conjugated Diene-Based Polymer

A butadiene polymer was prepared by performing the same method as in Example 1 except for using the catalyst composition of Preparation Example 2 as the catalyst composition for forming the active polymer in Example 1.

Example 3: Preparation of Conjugated Diene-Based Polymer

A butadiene polymer was prepared by performing the same method as in Example 1 except for using the catalyst composition of Preparation Example 3 as the catalyst composition for forming the active polymer in Example 1.

Comparative Example 1

BR1208 (manufacturer: LG chem) was used as unmodified Nd—BR.

Comparative Example 2

CB24 (manufacturer: Lanxess Co.) was used as unmodified Nd—BR.

Comparative Example 3

A butadiene polymer was prepared by performing the same method as in Example 1 except for using the catalyst composition of Comparative Preparation Example 1 as the catalyst composition for forming the active polymer in Example 1.

Comparative Example 4

A butadiene polymer was prepared by performing the same method as in Example 1 except for using the catalyst composition of Comparative Preparation Example 2 as the catalyst composition for forming the active polymer in Example 1.

Comparative Example 5

A butadiene polymer was prepared by performing the same method as in Example 1 except for using the catalyst composition of Comparative Preparation Example 3 as the catalyst composition for forming the active polymer in Example 1.

Experimental Examples

Experimental Example 1

With respect to the polymers prepared in the Examples and the Comparative Examples, microstructure analysis, a number average molecular weight (Mn), a weight average molecular weight (Mn), molecular weight distribution (MWD), mooney viscosity (MV) and a −S/R value were measured according to the methods below.

1) Microstructure Analysis

The cis-1,4 bond content, the trans-1,4 bond content, the vinyl content of each conjugated diene part were measured by Fourier transform infrared Spectroscopy (FT-IR).

Particularly, FT-IR transmittance spectrum of a carbon disulfide solution of a conjugated diene-based polymer that was prepared at a concentration of 5 mg/ml was measured with carbon disulfide of the same cell as a blank, and each content was obtained using the maximum peak value around 1130 cm$^{-1}$ (a, base line), the minimum peak value around 967 cm$^{-1}$ (b) showing a trans-1,4 bond, the minimum peak value around 911 cm$^{-1}$ (c) showing a vinyl bond, and the minimum peak value around 736 cm$^{-1}$ (d) showing a cis-1,4 bond of the measured spectrum.

2) Weight Average Molecular Weight (Mw), Number Average Molecular Weight (Mn) and Molecular Weight Distribution (MWD)

Each polymer was dissolved in tetrahydrofuran (THF) for 30 minutes under 40° C. conditions, and the resultant solution was loaded on gel permeation chromatography (GPC) and flown. In this case, two columns of PLgel Olexis (trade name, Polymer Laboratories Co.) and one column of PLgel mixed-C were used in combination. Also, newly replaced columns were all mixed bed type columns, and polystyrene was used as a gel permeation chromatography standard material.

3) Mooney Viscosity (MV, ML1+4, @100° C.) (MU) and −S/R (Stress/Relaxation) Value The mooney viscosity (ML1+4, @100° C.) (MU) was measured by using MV2000E of Monsanto Co. using Large Rotor at a rotor speed of 2±0.02 rpm conditions at 100° C. for each polymer. In this case, a specimen used was stood at room temperature (23±3° C.) for 30 minutes or more, and 27±3 g of the specimen was collected and put in a die cavity, and then, Platen was operated and the mooney viscosity was measured while applying torque. In addition, a −S/R value which was an absolute value of a gradient value was obtained by measuring the gradient value of the mooney viscosity change appearing during releasing the torque.

distribution of less than 0.30, and had relatively low linearity.

Through the results, it was found that the conjugated diene-based polymer according to an embodiment of the present invention was prepared by polymerizing a conjugated diene-based monomer in the presence of the catalyst composition which was suggested in the present invention, and had high linearity.

Experimental Example 2

Rubber compositions and rubber specimens were prepared using the butadiene polymers prepared in the Examples and the butadiene polymers prepared in the Comparative Examples, and then, tensile strength, 300% modulus, elongation and viscoelasticity properties were measured, respectively, according to the methods below, and the results are shown in Table 2 below.

Particularly, each rubber composition was prepared by compounding 100 parts by weight of each polymer with 70 parts by weight of carbon black, 22.5 parts by weight of a process oil, 2 parts by weight of an antiaging agent (TMDQ), 3 parts by weight of zinc white (ZnO), and 2 parts by weight of stearic acid. Then, to each rubber composition, 2 parts by weight of sulfur, 2 parts by weight of a vulcanizing accelerator (CZ) and 0.5 parts by weight of a vulcanization accelerator (DPG) were added and gently mixed at 50° C. for 1.5 minutes at 50 rpm. Then, by using a roll of 50° C., a vulcanized compounding product having a sheet shape was obtained. The vulcanized compounding product thus obtained was vulcanized at 160° C. for 25 minutes to manufacture a rubber specimen.

1) Tensile Strength (kg·f/cm$^2$), 300% Modulus (kg·f/cm$^2$) and Elongation

After vulcanizing each rubber composition at 150° C. for t90 minutes, the tensile strength, modulus when elongated by 300% (M-300%) and elongation when breaking of the vulcanized product were measured according to ASTM D412.

TABLE 1

| Division | | Example | | | Comparative Example | | | | |
|---|---|---|---|---|---|---|---|---|---|
| | | 1 | 2 | 3 | 1 | 2 | 3 | 4 | 5 |
| Microstructure analysis | Cis-1,4 bond | 97.1 | 96.9 | 97.3 | 96.2 | 96.3 | 96.5 | 96.7 | 96.6 |
| | Trans-1,4 bond | 2.3 | 2.5 | 2.1 | 1.8 | 3.2 | 2.7 | 2.7 | 2.8 |
| | Vinyl | 0.6 | 0.6 | 0.6 | 2.0 | 0.5 | 0.8 | 0.6 | 0.6 |
| GPC results | Mn (×10$^5$ g/mol) | 3.02 | 2.89 | 3.05 | 1.57 | 2.70 | 2.66 | 2.73 | 2.79 |
| | Mw (×10$^5$ g/mol) | 6.49 | 6.42 | 6.44 | 7.78 | 6.31 | 7.24 | 6.50 | 6.81 |
| | MWD (Mw/Mn) | 2.15 | 2.22 | 2.11 | 4.96 | 2.34 | 2.72 | 2.38 | 2.44 |
| Mooney viscosity (MV) | | 42 | 46 | 46 | 43 | 43 | 47 | 44 | 43 |
| −S/R | | 0.801 | 0.789 | 0.793 | 0.710 | 0.591 | 0.655 | 0.672 | 0.658 |
| (−S/R)/MWD (linearity) | | 0.373 | 0.355 | 0.376 | 0.143 | 0.253 | 0.241 | 0.282 | 0.270 |

As shown in Table 1, all the polymers of Example 1 to Example 3, prepared in the presence of the catalyst composition according to an embodiment of the present invention had the ratio ((−S/R)/MWD) of a −S/R value and molecular weight distribution of 0.3 or more and had high linearity. On the contrary, it was found that all the polymers of Comparative Example 1 to Comparative Example 5 had the ratio ((−S/R)/MWD) of a −S/R value and molecular weight 2) Viscoelasticity Properties (Tan δ@ 60° C.)

Tan δ properties, that are the major factors of a low fuel consumption properties were measured as viscoelasticity coefficient (Tan δ) at 60° C. at a frequency of 10 Hz, prestrain of 3%, and dynamic strain of 3% by using DMTS 500N of Gabo Co., Germany. In this case, with the increase of the Tan δ value at 60° C., hysteresis loss was decreased, this meant that rotation resistance properties became excellent, that is, a fuel consumption ratio became excellent.

TABLE 2

| Division | | Example | | | Comparative example | | | | |
|---|---|---|---|---|---|---|---|---|---|
| | | 1 | 2 | 3 | 1 | 2 | 3 | 4 | 5 |
| Tensile properties (Index) | M-300% | 97 | 100 | 101 | 86 | 100 | 92 | 96 | 95 |
| | Tensile strength | 105 | 103 | 106 | 94 | 100 | 86 | 97 | 98 |
| | Elongation | 98 | 100 | 97 | 106 | 100 | 93 | 99 | 101 |
| Viscoelasticity properties (Index) | Tan δ at 60° C. | 104 | 102 | 102 | 85 | 100 | 90 | 97 | 96 |

Here, the index value of the tensile properties was calculated through Mathematical Formula 1 below with setting the value of Comparative Example 2 to 100, and the index value of the viscoelasticity properties was calculated through Mathematical Formula 2 below with setting the value of Comparative Example 2 to 100

Index=(measured value/standard value)×100    [Mathematical Formula 1]

Index=(measured value/standard value)×100    [Mathematical Formula 2]

As shown in Table 2, it was confirmed that the rubber specimens prepared from the rubber compositions including the polymers of Example 1 to Example 3 according to embodiments of the present invention showed improved tensile properties and viscoelasticity properties overall when compared with the specimens prepared from the rubber compositions including the polymers of Comparative Example 1 to Comparative Example 6.

Particularly, the tensile properties and viscoelasticity properties of Example 1 to Example 3 were largely improved when compared with Comparative Example 3 to Comparative Example 5, which were performed under the same conditions as in Example 1 except for the catalyst composition, and this results showed that the conjugated diene-based polymer according to an embodiment of the present invention had high linearity and increased compounding processability when compared with a polymer having relatively low linearity, and the compounding properties thereof were improved.

The invention claimed is:

1. A method for preparing a conjugated diene-based polymer catalyzed with a lanthanide rare earth element, the conjugated diene-based polymer having a ratio ((-S/R)/MWD) of a stress/relaxation (S/R) value at 100° C. and molecular weight distribution (MWD) of 0.30 or more, comprising:
   injecting a lanthanide rare earth element-containing compound, a first alkylating agent, a second alkylating agent, a halide and a conjugated diene-based monomer into a hydrocarbon-based solvent one by one in order,
   mixing the lanthanide rare earth element-containing compound, the first alkylating agent, the second alkylating agent, the halide and the conjugated diene-based monomer at a temperature of −30° C. to −20° C., and standing at the temperature of −30° C. to −20° C. for 24 hours to 36 hours to prepare a lanthanide rare earth element catalyst composition, and
   polymerizing the conjugated diene-based monomer in the presence of a lanthanide rare earth element catalyst composition to prepare an active polymer comprising an organometal part,
   wherein the lanthanide rare earth element-containing compound, the first alkylating agent, the second alkylating agent, the halide and a-the conjugated diene-based monomer are included in a molar ratio of 1:100 to 200:40 to 60:2 to 4:20 to 50, and
   wherein the first alkylating agent is one or more aluminoxanes, and the second alkylating agent is one or more selected from the group consisting of diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride benzyl-n-octylaluminum hydride, ethylaluminum dihydride, n-propylaluminum dihydride, isopropylaluminum dihydride, n-butylaluminum dihydride, isobutylaluminum dihydride, and n-octylaluminum dihydride.

2. The method according to claim 1, wherein the lanthanide rare earth element-containing compound comprises a neodymium compound represented by the following Formula 1:

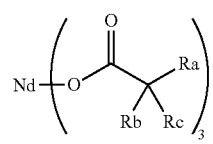

[Formula 1]

wherein in Formula 1,
$R_a$ to $R_c$, are each independently hydrogen, or an alkyl group of 1 to 12 carbon atoms, where $R_a$ to $R_c$, are not hydrogen at the same time.

3. The method according to claim 1, wherein the first alkylating agent is selected from the group consisting of methylaluminoxane, modified methylaluminoxane, ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane and 2,6-dimethylphenyl aluminoxane.

4. The method according to claim 1, further comprising reacting the active polymer with a modifier represented by the following Formula 4 or Formula 5:

[Formula 4]

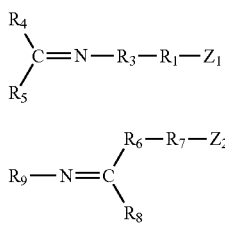

[Formula 5]

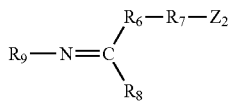

wherein in Formula 4 or Formula 5, $Z_1$ and $Z_2$ are each independently a silane group, N,N-2 substituted aminophenyl group, an imine group or a cyclic amino group, $R_1$ and $R_7$ are each independently a single bond or a divalent organic group, $R_3$ and $R_6$ are each independently a single bond or a divalent organic group; or $R_3$ and $R_6$ are trivalent organic groups which are connected with $R_4$ or $R_5$, and $R_8$ or $R_9$, respectively to form rings, $R_4$ and $R_8$ are each independently a monovalent organic group; or $R_4$ and $R_8$ are divalent organic groups which are connected with $R_3$ or $R_5$, and $R_6$ or $R_9$, respectively, to form rings, and $R_5$ is a monovalent organic group; or a divalent organic group which is connected with $R_3$ or $R_4$ to form a ring.

5. The method according to claim 1, wherein the lanthanide rare earth element catalyst composition consists of the lanthanide rare earth element-containing compound, the first alkylating agent, the second alkylating agent, the halide, and the aliphatic hydrocarbon-based solvent, and optionally further a non-coordinating anion-containing compound, and a non-coordinating anion precursor compound.

* * * * *